US012804297B2

(12) United States Patent
Shi et al.

(10) Patent No.: US 12,804,297 B2
(45) Date of Patent: Nov. 17, 2026

(54) SPEAKER

(71) Applicant: AAC Microtech (Changzhou) Co., Ltd., Changzhou City (CN)

(72) Inventors: Yang Shi, Shenzhen (CN); Xingxing Xin, Shenzhen (CN)

(73) Assignee: AAC Microtech (Changzhou) Co., Ltd., Changzhou City (CN)

( * ) Notice: Subject to any disclaimer, the term of this patent is extended or adjusted under 35 U.S.C. 154(b) by 172 days.

(21) Appl. No.: 17/921,979

(22) PCT Filed: Jul. 20, 2022

(86) PCT No.: PCT/CN2022/106640
§ 371 (c)(1),
(2) Date: Mar. 10, 2025

(87) PCT Pub. No.: WO2024/000681
PCT Pub. Date: Jan. 4, 2024

(65) Prior Publication Data

US 2025/0203259 A1 Jun. 19, 2025

(30) Foreign Application Priority Data

Jun. 30, 2022 (CN) ........................ 202221693879.9

(51) Int. Cl.
*H04R 1/06* (2006.01)
*H04R 7/12* (2006.01)
(Continued)

(52) U.S. Cl.
CPC ............... *H04R 1/06* (2013.01); *H04R 7/122* (2013.01); *H04R 7/127* (2013.01); *H04R 9/025* (2013.01);
(Continued)

(58) Field of Classification Search
CPC .......... H04R 1/06; H04R 7/122; H04R 7/127; H04R 9/025; H04R 9/045; H04R 9/06; H04R 2400/11
See application file for complete search history.

(56) References Cited

U.S. PATENT DOCUMENTS 10,924,865 B2 * 2/2021 Song ........................ H04R 1/06
2017/0366900 A1 * 12/2017 Linghu ................ H04R 31/003
(Continued)

FOREIGN PATENT DOCUMENTS

CN 205961439 U * 2/2017
CN 208638656 U * 3/2019

*Primary Examiner* — Paul W Huber
(74) *Attorney, Agent, or Firm* — Wiersch Law Group

(57) ABSTRACT

A speaker includes a frame, a vibration system, a magnetic circuit system, and flexible printed circuit boards. The vibration system, the magnetic circuit system, and the flexible printed circuit boards are accommodated in the frame. The vibration system comprises a sound film and a voice coil. The voice coil is configured to drive the sound film to vibrate and produce sound. The magnetic circuit system comprises a first magnetic steel and a second magnetic steel. The second magnetic steel is disposed around a periphery of the first magnetic steel. A magnetic gap is formed between the second magnetic steel and the first magnetic steel. The voice coil is disposed in the magnetic gap. Each of the flexible printed circuit boards includes an inner fixing portion, outer fixing portions, and elastic arms. The flexible printed circuit boards do not overlap with the voice coil. The speaker has better performance.

9 Claims, 4 Drawing Sheets

(51) Int. Cl.
*H04R 9/02* (2006.01)
*H04R 9/04* (2006.01)
*H04R 9/06* (2006.01)

(52) U.S. Cl.
CPC ............... *H04R 9/045* (2013.01); *H04R 9/06* (2013.01); *H04R 2400/11* (2013.01)

(56) References Cited

U.S. PATENT DOCUMENTS

| | | | | |
|---|---|---|---|---|
| 2020/0045459 | A1* | 2/2020 | Hu | H05K 1/028 |
| 2020/0053472 | A1* | 2/2020 | Xiao | H04R 9/025 |
| 2021/0029464 | A1* | 1/2021 | Pan | H04R 9/04 |

* cited by examiner

SPEAKER

TECHNICAL FIELD

The present disclosure relates to the field of electroacoustic conversion, and in particular to a speaker for portable electronic products.

BACKGROUND

A speaker is configured as a sound playing device for portable electronic products, and performance of the speaker further put forward higher requirements since sound playing requirements of people are increased. How to have a greater frequency response output under a same voltage becomes a focus of general research in industry.

At present, one important factor to limit the speaker frequency response output is magnetic force (BL) of the speaker. In general, the higher the BL of the speaker, the larger a displacement of a sound film under the same voltage, and the higher sensitivity of the speaker. In the related art, a flexible printed circuit board (FPC) is disposed between a voice coil and the sound film, and a circle of steps is disposed on an edge of a pole core to avoid the FPC and excessive glue, and the BL has a loss.

Therefore, it is necessary to provide a new speaker to solve above technical problems.

SUMMARY

The present disclosure aims at overcoming above technical problems, and provides a speaker having better performance.

In order to achieve above purpose, the present disclosure provides the speaker, including a frame, a vibration system, a magnetic circuit system, and flexible printed circuit boards. The vibration system, the magnetic circuit system, and the flexible printed circuit boards are accommodated in the frame. The vibration system includes a sound film and a voice coil. The voice coil is configured to drive the sound film to vibrate and produce sound. The magnetic circuit system includes a first magnetic steel and a second magnetic steel. The second magnetic steel is disposed around a periphery of the first magnetic steel. A magnetic gap is formed between the second magnetic steel and the first magnetic steel. The voice coil is disposed in the magnetic gap. Each of the flexible printed circuit boards includes an inner fixing portion, outer fixing portions, and elastic arms. The outer fixing portions are disposed on two sides of the inner fixing portion. The elastic arms are connected to the inner fixing portion and the outer fixing portions. The inner fixing portion is fixedly connected to the sound film. The outer fixing portions are fixedly connected to the frame. The flexible printed circuit boards are disposed on an outer side of the voice coil along a vibration direction of the sound film. The flexible printed circuit boards do not overlap with the voice coil.

Furthermore, the frame is generally rectangular, the speaker further includes two flexible printed circuit boards, and the two flexible printed circuit boards are respectively disposed along two long sides of the frame.

Furthermore, the outer fixing portions are fixed to four corners of the frame.

Furthermore, the sound film includes an inner ring portion, a folding ring portion, an outer ring portion, an outer wall, and a dome. The folding ring portion extends outwards from the inner ring portion. The outer ring portion extends outwards from the folding ring portion. The outer wall is bent and extends along the vibration direction from an outer side edge of the outer ring portion. The dome is fixed to the inner ring portion. The inner fixing portion is fixed to the dome.

Furthermore, the outer wall is annular.

Furthermore, the dome includes a dome body and a dome outer edge portion. The dome outer edge portion extends outwards from the dome body. The inner fixing portion is fixed to the dome outer edge portion.

Furthermore, the frame includes an upper surface and a groove. The upper surface is close to the sound film and the groove is recessed from an outer side of the upper surface towards a direction distal from the sound film. The outer wall is disposed in the groove.

Furthermore, the upper surface is fixedly connected to the outer ring portion.

Furthermore, pads are disposed on the four corners of the frame. The outer fixing portions are fixedly connected to the pads.

In the speaker of the present disclosure, the flexible printed circuit boards do not overlap with the voice coil along the vibration direction of the sound film, an edge of a pole core does not extrude steps, which improves magnetic force (BL), provides larger driving force, effectively improves sensitivity, and provides better performance for the speaker.

BRIEF DESCRIPTION OF DRAWINGS

In order to more clearly illustrate technical solutions in embodiments of the present disclosure, drawings required in description of the embodiments are briefly described below. Obviously, the drawings in the following description are merely some embodiments of the present disclosure. For a person of ordinary skill in art, other drawings may be obtained according to the drawings without creative efforts.

DETAILED DESCRIPTION

Technical solutions in embodiments of the present disclosure are clearly and completely described below with reference to accompanying drawings in the embodiments of the present disclosure. Obviously, the described embodiments are only a part of the embodiments of the present disclosure, not all of the embodiments. Based on the embodiments of the present disclosure, all other embodiments obtained by a person of ordinary skill in art without creative efforts shall fall within a protection scope of the present disclosure.

Figure 1:
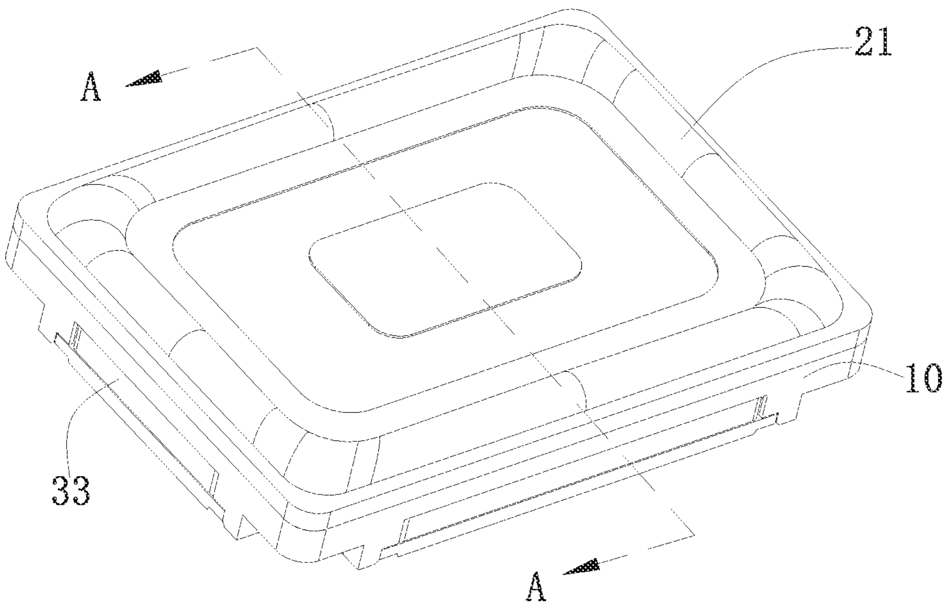
FIG. 1 is a three-dimensional schematic diagram of a speaker according to one embodiment of the present disclosure.
Figure 2:
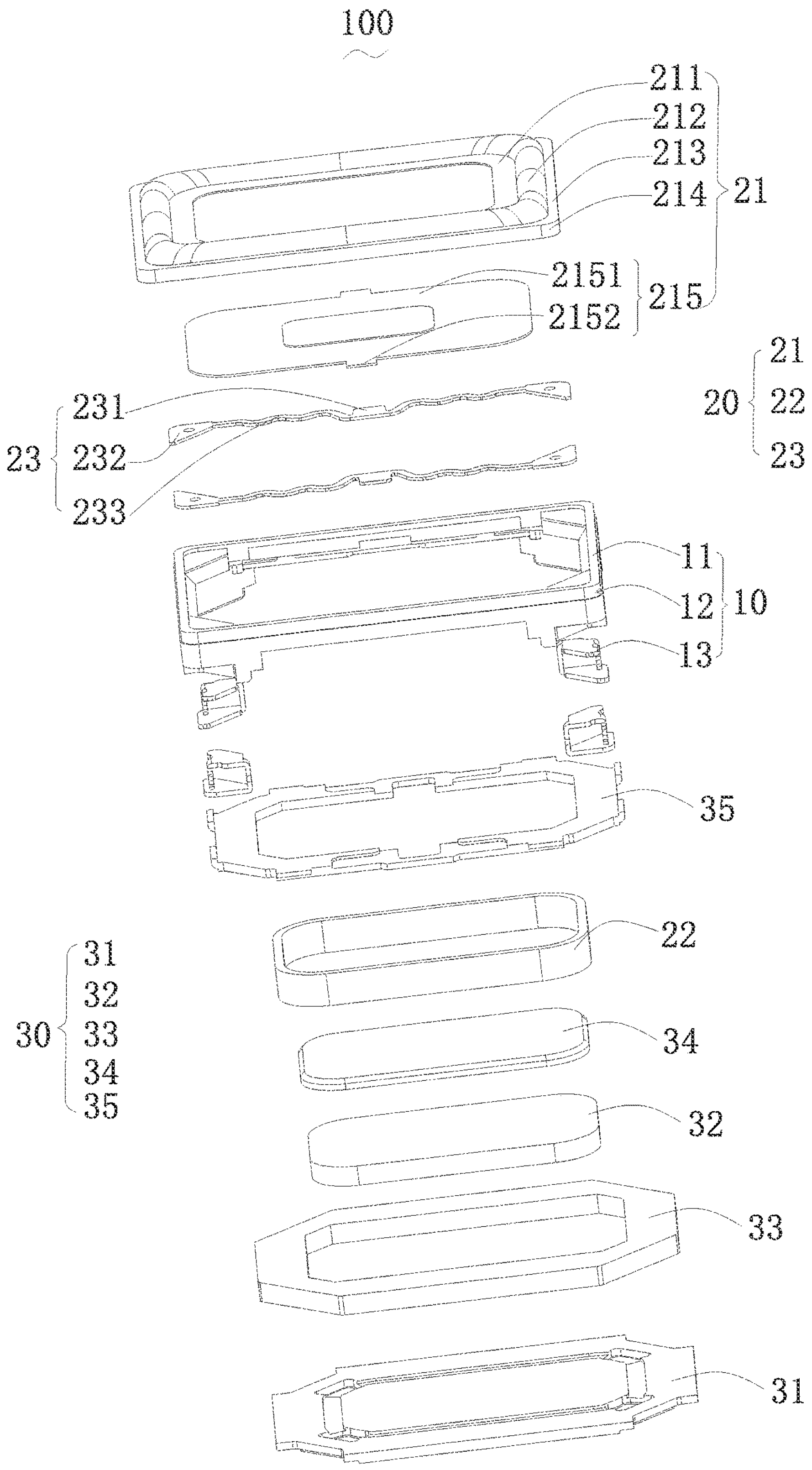
FIG. 2 is an exploded three-dimensional schematic diagram of the speaker shown in FIG. 1.
Figure 3:
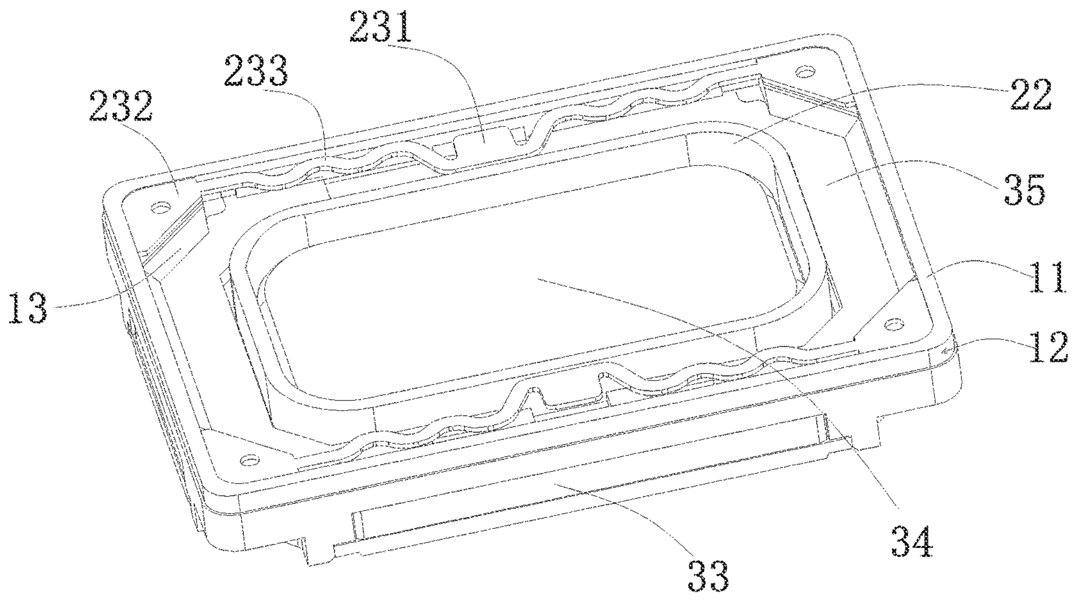
FIG. 3 is a partial structural schematic diagram of a first view angle of the speaker shown in FIG. 1.
Figure 4:
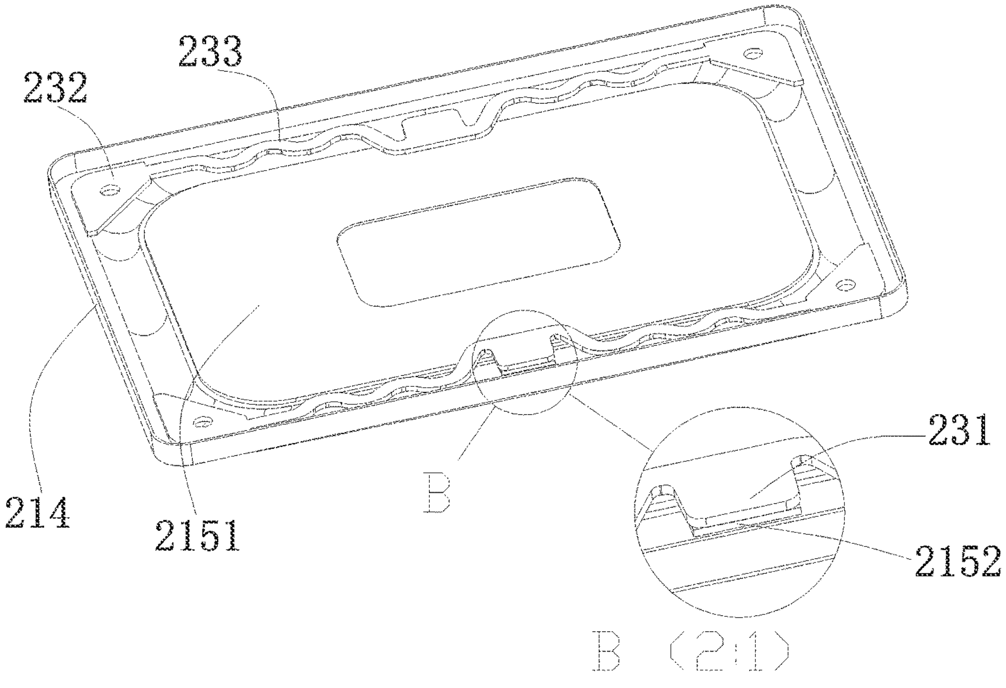
FIG. 4 is a partial structural schematic diagram of a second view angle of the speaker shown in FIG. 1.
Figure 5:
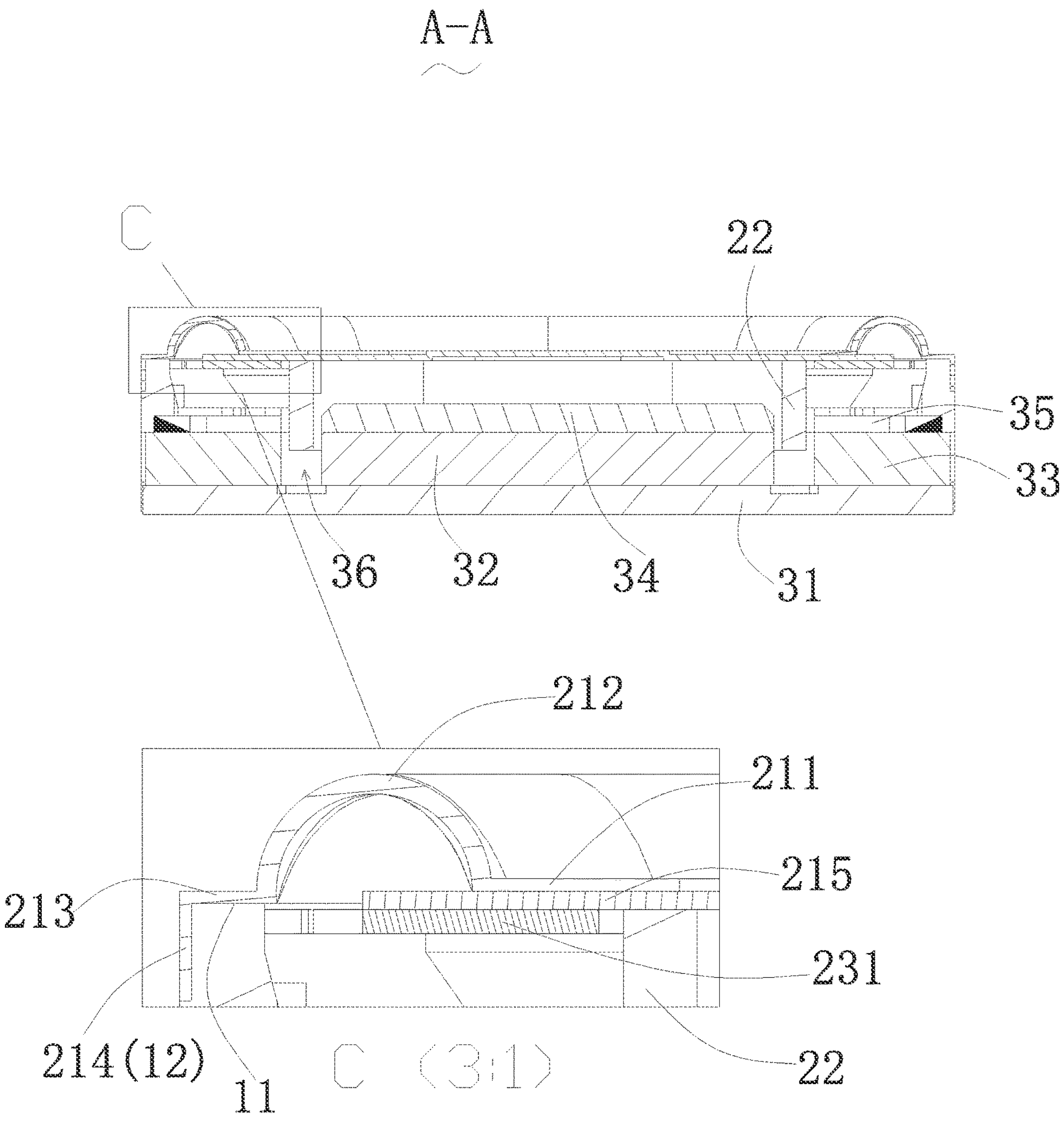
FIG. 5 is a cross-sectional schematic diagram taken along the line A-A shown in FIG. 1.

Referring to FIGS. 1-5, the present disclosure provides a speaker 100. The speaker 100 includes a frame 10, a vibration system 20, and a magnetic circuit system 30. The vibration system 20 and the magnetic circuit system 30 are accommodated in the frame 10.

The magnetic circuit system 30 includes a lower clamping plate 31, a first magnetic steel 32, a second magnetic steel 33, a first pole core 34, and a second pole core 35. The first magnetic steel 32 is disposed on the lower clamping plate 31. The second magnetic steel 33 is annular, and the second magnetic steel 33 is disposed on the lower clamping plate 31 and surrounds the first magnetic steel 32. The first pole core 34 is attached to the first magnetic steel 32, and the second pole core 35 is attached to the second magnetic steel 33. The second magnetic steel 33 is disposed around a periphery of the first magnetic steel 32, and a magnetic gap 36 is formed between the second magnetic steel 33 and the first magnetic steel 32. A voice coil 22 is disposed in the magnetic gap 36.

The vibration system 20 includes a sound film 21, the voice coil 22, and flexible printed circuit boards 23. The voice coil 22 is configured to drive the sound film 21 to vibrate and produce sound.

The sound film 21 includes an inner ring portion 211, a folding ring portion 212, an outer ring portion 213, an outer wall 214, and a dome 215. The folding ring portion 212 extends outwards from the inner ring portion 211. The outer ring portion 213 extends outwards from the folding ring portion 212. The outer wall 214 is bent and extends along the vibration direction from an outer side edge of the outer ring portion 213. The dome 215 is fixed to the inner ring portion 211.

Each of the flexible printed circuit boards 23 includes an inner fixing portion 231, outer fixing portions 232, and elastic arms 233. The outer fixing portions 232 are disposed on two sides of the inner fixing portion 231. The elastic arms 233 are connected to the inner fixing portion 231 and the outer fixing portions 232. The inner fixing portion 231 is fixedly connected to the sound film 21. The outer fixing portions 232 are fixedly connected to the frame 10. The flexible printed circuit boards 23 are disposed on an outer side of the voice coil 22 along a vibration direction of the sound film 21. The flexible printed circuit boards 23 do not overlap with the voice coil 22.

Furthermore, the frame 10 is generally rectangular, the vibration system 20 further includes two flexible printed circuit boards 23, and the two flexible printed circuit boards 23 are respectively disposed along two long sides of the frame 10, so that force arms of each of the flexible printed circuit boards 23 are centrally symmetrical, and the voice coil 22 vibrates more balanced. In other optional embodiments, the number of the flexible printed circuit boards is further adjusted to other numbers according to shapes and sizes of the frame and the sound film for supporting balance. In the embodiment, the two flexible printed circuit boards 23 includes four outer fixing portions 232 and two inner fixing portions 231. The four outer fixing portions 232 are fixed to four corners of the frame 10, and two inner fixing portions 231 are fixed to the dome 215.

Furthermore, pads 13 are disposed on the four corners of the frame 10. The outer fixing portions 232 are fixedly connected to the pads 13. The outer fixing portions 232 and the pads 13 are welded and fixed, so that connection between the flexible printed circuit boards and the frame is firmer. In other optional embodiments, the outer fixing portions may be not welded with the pads, and the outer fixing portions may be fixed to the pads through the frame or other elements provided in the frame.

Furthermore, the dome 215 includes a dome body 2151 and a dome outer edge portion 2152, the dome outer edge portion 2152 extends outwards from the dome body 2151, and the inner fixing portion 231 is fixed to the dome outer edge portion 2152, which increases a contact area between the inner fixing portions and the dome, makes connection between the FPC and the dome more stable. In other optional embodiments, the dome outer edge portion may not be provided if the connection between the FPC and the dome is ensured to be stable.

The frame 10 includes an upper surface 11 and a groove 12. The upper surface 11 is close to the sound film 21. The groove 12 is recessed from an outer side of the upper surface 11 towards a direction distal from the sound film 21. The outer wall 214 is ring-shaped, and the outer wall 214 is disposed in the groove 12. The upper surface 11 is fixedly connected to the outer ring portion 213. The sound film and the frame are designed with edge wrapping, a width of the frame is narrower, the effective vibration area SD of the sound film is larger, so that performance of the speaker is improved.

In the speaker of the present disclosure, the flexible printed circuit boards do not overlap with the voice coil along the vibration direction of the sound film, an edge of a pole core does not extrude steps, which improves magnetic force (BL), provides larger driving force, effectively improves sensitivity, and provides better performance for the speaker.

The above are only the embodiments of the present disclosure. It should be noted that, for the person of ordinary skill in the art, improvements are made without departing from concepts of the present disclosure, but these are all within the protection scope of the present disclosure.

What is claimed is:

1. A speaker, comprising:

a frame;

a vibration system; and a magnetic circuit system;

wherein the vibration system and the magnetic circuit system are accommodated in the frame; the vibration system comprises a sound film, a voice coil, and flexible printed circuit boards; the voice coil is configured to drive the sound film to vibrate and produce sound, the magnetic circuit system comprises a first magnetic steel and a second magnetic steel; the second magnetic steel is disposed around a periphery of the first magnetic steel, a magnetic gap is formed between the second magnetic steel and the first magnetic steel, the voice coil is disposed in the magnetic gap; each of the flexible printed circuit boards comprises an inner fixing portion, outer fixing portions, and elastic arms; the outer fixing portions are disposed on two sides of the inner fixing portion, and the elastic arms are connected to the inner fixing portion and the outer fixing portions; the inner fixing portion is fixedly connected to the sound film, the outer fixing portions are fixedly connected to the frame, the flexible printed circuit boards are disposed on an outer side of the voice coil along a vibration direction of the sound film, and the flexible printed circuit boards do not overlap with the voice coil.

2. The speaker according to claim 1, wherein the frame is generally rectangular, the vibration system further comprises two flexible printed circuit boards, and the two flexible printed circuit boards are respectively disposed along two long sides of the frame.

3. The speaker according to claim 2, wherein the outer fixing portions are fixed to four corners of the frame.

4. The speaker according to claim 1, wherein the sound film comprises an inner ring portion, a folding ring portion, an outer ring portion, an outer wall, and a dome; the folding ring portion extends outwards from the inner ring portion, the outer ring portion extends outwards from the folding ring portion, the outer wall is bent and extends along the vibration direction of the sound film from an outer side edge of the outer ring portion, the dome is fixed to the inner ring portion, and the inner fixing portion is fixed to the dome.

5. The speaker according to claim 4, wherein the outer wall is annular.

6. The speaker according to claim 4, wherein the dome comprises a dome body and a dome outer edge portion, the dome outer edge portion extends outwards from the dome body, and the inner fixing portion is fixed to the dome outer edge portion.

7. The speaker according to claim 4, wherein the frame comprises an upper surface and a groove; the upper surface is close to the sound film, the groove is recessed from an outer side of the upper surface towards a direction distal from the sound film, and the outer wall is disposed in the groove.

8. The speaker according to claim 7, wherein the upper surface is fixedly connected to the outer ring portion.

9. The speaker according to claim 3, wherein pads are disposed on the four corners of the frame, and the outer fixing portions are respectively and fixedly connected to the pads.

* * * * *